(12) United States Patent
Groarke

(10) Patent No.: US 10,586,259 B2
(45) Date of Patent: Mar. 10, 2020

(54) ENRICHING MERCHANT IDENTIFIERS ASSOCIATED WITH ACCOUNT DATA UPDATE REQUESTS

(71) Applicant: MasterCard International Incorporated, Purchase, NY (US)

(72) Inventor: Peter Groarke, Dublin (IE)

(73) Assignee: Mastercard International Incorporated, Purchase, NY (US)

( * ) Notice: Subject to any disclaimer, the term of this patent is extended or adjusted under 35 U.S.C. 154(b) by 268 days.

(21) Appl. No.: 15/616,509

(22) Filed: Jun. 7, 2017

(65) Prior Publication Data

US 2018/0357687 A1    Dec. 13, 2018

(51) Int. Cl.
| | | |
|---|---|---|
| *G06Q 30/00* | (2012.01) | |
| *G06Q 30/04* | (2012.01) | |
| *G06F 16/23* | (2019.01) | |
| *G06Q 20/14* | (2012.01) | |
| *G06Q 20/42* | (2012.01) | |

(52) U.S. Cl.
CPC ............. *G06Q 30/04* (2013.01); *G06F 16/23* (2019.01); *G06Q 20/14* (2013.01); *G06Q 20/42* (2013.01)

(58) Field of Classification Search
CPC ......... G06Q 20/40; G06Q 20/22; G06Q 30/04
USPC .................................................... 705/44, 34
See application file for complete search history.

(56) References Cited

U.S. PATENT DOCUMENTS

| | | | |
|---|---|---|---|
| 8,489,476 B1 * | 7/2013 | Lester .................... | G06Q 40/02 705/35 |
| 8,694,429 B1 | 4/2014 | Ballaro et al. | |
| 2003/0217094 A1 | 11/2003 | Andrews et al. | |
| 2004/0162773 A1 * | 8/2004 | Del Rey ................. | G06Q 40/00 705/36 R |
| 2007/0185782 A1 * | 8/2007 | Shooks ................... | G06Q 20/00 705/26.35 |
| 2009/0276269 A1 | 11/2009 | Yee et al. | |
| 2012/0296824 A1 * | 11/2012 | Rosano ................. | G06Q 20/102 705/44 |
| 2013/0159077 A1 | 6/2013 | Stringfellow et al. | |
| 2014/0032409 A1 * | 1/2014 | Rosano ................. | G06Q 20/401 705/44 |

(Continued)

FOREIGN PATENT DOCUMENTS

| | | |
|---|---|---|
| EP | 2420966 A1 | 2/2012 |
| WO | 2012135115 A2 | 10/2012 |

OTHER PUBLICATIONS

PCT International Search Report and Written Opinion, Application No. PCT/US2018/031980, dated Jul. 26, 2018, 11 pps.

*Primary Examiner* — Oluseye Iwarere
(74) *Attorney, Agent, or Firm* — Armstrong Teasdale LLP

(57) ABSTRACT

A regulated automatic billing updater (ABU) computing device for enriching data included within a data set is provided. The regulated ABU computing device is for enriching merchant identifiers included within account data update requests. The regulated ABU computing device is configured to receive a request for updated account data. The regulated ABU computing device is further configured to retrieve from a transaction database data associated with one or more merchants and identify a target merchant from the transaction database. The regulated ABU computing device is configured to associate the target merchant with the non-enriched merchant identifier to generate an enriched merchant identifier.

17 Claims, 4 Drawing Sheets

(56) References Cited

U.S. PATENT DOCUMENTS

| | | | |
|---|---|---|---|
| 2014/0258099 A1* | 9/2014 | Rosano | G06Q 20/409 705/39 |
| 2014/0337215 A1* | 11/2014 | Howe | G06Q 20/20 705/44 |
| 2016/0125317 A1 | 5/2016 | Benjamin | |
| 2016/0125405 A1* | 5/2016 | Alterman | G06Q 20/385 705/44 |
| 2017/0116585 A1* | 4/2017 | Rosano | G06Q 40/12 |

* cited by examiner

ENRICHING MERCHANT IDENTIFIERS ASSOCIATED WITH ACCOUNT DATA UPDATE REQUESTS

BACKGROUND

The present disclosure relates generally to information networks and, more particularly, to computer systems and computer-based methods for enriching merchant identifiers associated with requests for updated cardholder account data.

A payment card is a cashless payment device that may be embodied, for example, as a credit card, debit card, contactless RFID-enabled device including a smart card, Near-Field Communication enabled smartphone, electronic mobile wallet or the like. The payment card may be a device, real or virtual, by which the cardholder, as payer and/or source of funds for the payment, may be identified.

A payment card may be presented by a cardholder for transacting a payment at a point of sale or from a remote location. In some instances, individuals may repeatedly transact transactions with a single merchant, such as a repeat customer or by way of recurring payments. A repeat transaction may be triggered at regularly scheduled intervals or upon occurrence of an event, for example, the balance reaching a predetermined threshold.

It has become common for individuals to enroll with merchants with whom they expect to have repeat transactions for goods and services using a payment card. Once enrolled, when making a transaction, the individual need not reenter personal data and payment card data. Instead, the merchant may attempt to complete a transaction using the already submitted personal and payment card data. These transactions are known as "card-not-present" (CNP) transactions. In such transactions, data regarding the payment card, including a personal account number (PAN) and, in many instances, an expiration date for the payment card is transmitted from a merchant, along with an indicator that the transaction is a CNP transaction. An "account-on-file" transaction is another type of transaction in which the merchant stores data regarding the cardholder's payment card in a database, then retrieves the stored payment card data and includes it in a payment authorization request. One specific type of account-on-file transaction is a "recurring payment transaction," which a merchant initiates on a recurring basis for a particular cardholder. In such recurring payment transactions, the merchant stores data regarding the cardholder's payment card in a database, then retrieves the stored payment card data and includes it in each recurring authorization request.

An example of a recurring card-on-file payment transaction is a gym membership. Rather than mailing a monthly check for membership with a gym, a cardholder might choose to register a payment card, such as a credit card, a debit card, or a prepaid card, with the gym. Registering the payment card with the gym enables the gym to automatically charge the payment card for the monthly dues on a particular day each month. In some such systems, the merchant stores a PAN, an expiration date, and/or other data associated with the payment card and/or cardholder. Given the convenience of this payment model for both merchants and cardholders, it finds use in many other scenarios where a cardholder is a member of a club or subscriber of products or services. Accordingly, multiple merchants may have stored payment card data for the same cardholder. Likewise, any given merchant may have stored payment card data for multiple cardholders.

During an authentication phase of a transaction, the personal account data may be used by authenticating entities to authenticate the transaction. Entities involved in the authentication process may include, for example, the issuing bank that issued the payment card to the cardholder, the merchant, and/or the merchant bank that authorizes payment card transaction and transfers money on behalf of the merchant. These activities may be coordinated by a credit card payment system including a payment processor. In some instances, the issuing bank and the merchant bank compare personal account data associated with the cardholder for verification purposes before authorizing the transaction. However, when the personal account data stored by the issuing bank and the merchant bank do not match, such as due to an update of personal account data with only one of the authenticating entities, the transaction may be denied.

When a cardholder's personal account data changes, transactions may be denied unless updates are shared with each authentication entity. The process for updating personal account data can be tedious and time consuming. What is more, the updating process may be performed haphazardly since individuals do not typically have a comprehensive list of parties that they have enrolled with for future or recurring transactions. Missing an update may cause denial of an important payment, potentially causing further complications and penalty fees.

To prevent these interruptions, merchants may submit requests for cardholder account data updates directly to the payment card payment system associated with the payment card. Ideally, enabled cardholders would have control over whether or not such a request is granted or denied. However, the request may contain non-enriched merchant identifiers that may obfuscate or otherwise render unrecognizable the identity of the merchant to a cardholder. Thus, a cardholder would be unable to make an informed decision whether to grant or deny the request. There is therefore a need to enrich merchant identifiers associated with requests for updated cardholder account data so as to make the identity of the requesting merchant more obvious to cardholders.

BRIEF DESCRIPTION

In one aspect, a regulated automatic billing updater (ABU) computing device is disclosed. The regulated ABU computing device is for enriching data included within a data set. The regulated ABU computing device includes one or more processors in communication with one or more memory devices. The regulated ABU computing device is configured to: receive a request for updated account data for a set of account identifiers wherein the request includes the set of account identifiers and a merchant identifier and wherein the list of account identifiers including one or more account identifiers, the merchant identifier being a non-enriched merchant identifier; retrieve from a database transaction data associated with one or more merchants wherein the transaction data includes a list of account identifiers having been used to initiate a transaction with the one or more merchants; identify a target merchant by determining which merchant from the transaction database has transacted with each account identifier included in the merchant request; and associate the target merchant with the non-enriched merchant identifier to generate an enriched merchant identifier.

In another embodiment, a computer-implemented method of enriching merchant identifiers associated with payment card update requests is provided. The method is implemented using a regulated automatic billing updater (ABU)

computing device. The method includes receiving, by the regulated automatic billing updater (ABU) computing device, a request for updated account data for a set of account identifiers, the request including the set of account identifiers and a merchant identifier, the list of account identifiers including one or more account identifiers, the merchant identifier being a non-enriched merchant identifier. The method further includes retrieving, from a database, transaction data associated with one or more merchants, the transaction data including a list of account identifiers having been used to initiate a transaction which the one or more merchants. The method further includes identifying, by the regulated automatic billing updater (ABU) computing device, a target merchant by determining which merchant from the transaction database has transacted with each account identifier included in the merchant request, and associating the target merchant with the non-enriched merchant identifier to generate an enriched merchant identifier.

In still another embodiment, a non-transitory computer readable medium that includes computer executable instructions for enriching data within a data set is provided. When executed by at least one processor of a regulated automatic billing updater (ABU) computing device, the computer executable instructions cause the at least one processor to receive a request for updated account data for a set of account identifiers, the request including the set of account identifier and a merchant identifier, the list of account identifiers including one or more account identifiers, the merchant identifier being a non-enriched merchant identifier. The computer executable instructions further cause the at least one processor to retrieve, from a database, transaction data associated with one or more merchants, the transaction data including a list of account identifiers having been used to initiate a transaction which the one or more merchants. The computer executable instructions further cause the at least one processor to identify a target merchant by determining which merchant from the transaction database has transacted with each account identifier included in the merchant request, and associate the target merchant with the non-enriched merchant identifier to generate an enriched merchant identifier.

BRIEF DESCRIPTION OF THE DRAWINGS

FIG. 1 is a schematic diagram illustrating a payment platform having a regulated automatic billing updater (ABU) computing device.

FIG. 2 is a schematic diagram illustrating an exemplary multi-party network system that includes the regulated ABU computing device shown in FIG. 1 for enriching non-enriched merchant identifiers.

FIG. 3 is a diagram illustrating an example of the regulated ABU computing device shown in FIGS. 1 and 2.

FIG. 4 is a flow chart illustrating an example method for enriching non-enriched merchant identifiers using the regulated ABU computing device shown in FIGS. 1 and 2 in accordance with one example embodiment of the present disclosure.

DETAILED DESCRIPTION

Figure 1:
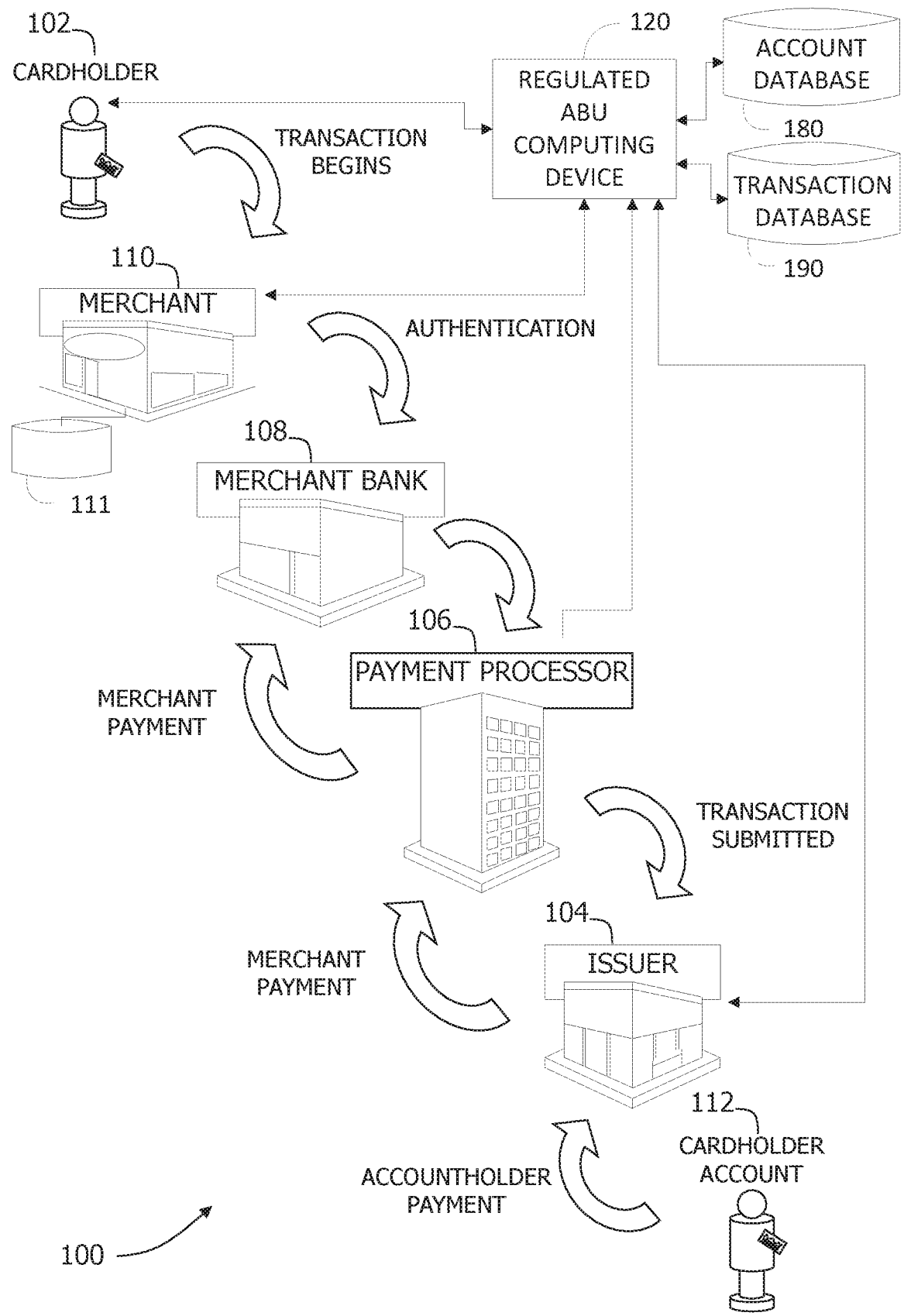
FIGS. 1-4 show example embodiments of the methods and systems described herein.

The systems and methods described herein are directed to a regulated automatic billing updater (ABU) computing device for enriching merchant identifiers associated with cardholder account update requests submitted by merchants. This enhanced ABU computing device is referred to herein as a "regulated ABU computing device".

In general, the regulated ABU computing device periodically receives account data and account data updates from one or more issuers, and maintains the account data in a regulated ABU computing device account database. Account data and account data updates are associated with unique personal account numbers (PANs). Account data and account data updates may include a PAN, an expiration date, and/or other data associated with the payment card and/or cardholder. The regulated ABU computing device is also in communication with a payment processor and aggregates transaction data. The transaction data may include a list of PANs and a list of merchants with which the PANs have transacted. The transaction data is indexed by merchant, and thus each merchant in the database is associated with a list of PANs. Transaction data may also include transaction dates and times, the physical addresses associated with transactions, transaction amounts, etc. Transaction data is stored in a regulated ABU computing device transaction database, and may be stored together with the account data or in a separate database. The transaction data may include transactions completed within a specified window of time (e.g., within the past ninety days). The merchants associated with the transaction data may be identified using transaction identifiers. These merchant transaction identifiers may be similar to the identifiers found in cardholder transaction summaries, such as might appear in account statements or bills. Merchant transaction identifiers are meant to be recognizable to cardholders.

If a merchant or other requesting party wishes to verify or update its account data for a list of PANs, the requesting party may submit an update request to the regulated ABU computing device. In certain embodiments, multiple update requests from one or more requesting parties may be collected and submitted to the regulated ABU computing device as a batch. For example, a merchant bank may collect multiple update requests from one or more merchants and submit the update requests as a batch to the ABU manager computing device.

In some embodiments, an update request made by or on behalf of a merchant may include identifying data elements which may not correlate with an easily recognizable merchant name. Although associated with a merchant, these data elements represent a non-enriched merchant identifier. Unlike merchant transaction identifiers, non-enriched merchant identifiers are not necessarily meant to be recognizable to cardholders and may obfuscate the identity of the merchant to a cardholder.

The regulated ABU computing device is configured to generate an enriched merchant identifier based on the list of PANs included in the merchant update request. The request PAN list is compared to each PAN list stored in the transaction database. If the request PAN list is found to be a subset of a PAN list in the transaction data, the associated merchant transaction identifier is used to identify a target merchant. As used herein, a "subset" may refer to one of a proper and improper subset.

In some embodiments, the regulated ABU computing device may use the merchant transaction identifier of the target merchant to generate an enriched merchant identifier. In some embodiments, the regulated ABU computing device may use the target merchant's transaction identifier in combination with other transaction data, herein referred to as enrichment data, to generate enriched merchant identifiers unique to each PAN within the request PAN list. Enrichment data may include the date and/or time of recent transactions, the physical address of the target merchant, transaction amounts, etc. In some embodiments, enrichment data may be retrieved by the regulated ABU computing device from the transaction database.

In some embodiments, the regulated ABU computing device may forward the merchant update request to each cardholder associated with each PAN within the original request. The forwarded request, herein referred to as an ABU update request, may include a request message and a cardholder response portal. The request message includes the enriched merchant identifier, enabling each cardholder to readily identify the requesting merchant, and a text prompt communicating the desire of the merchant to access updated account data. The cardholder response portal enables the cardholder to select whether to allow the requesting merchant access to updated account data or to deny the request.

In some embodiments, the regulated ABU computing device receives the cardholder response, generates an ABU response message and transmits it to the requesting merchant. The ABU response message includes the decision by the cardholder to grant or deny the update request. If the request was granted by the cardholder, the ABU response message may include updated account data in fulfillment of the request. If the request was denied by the cardholder, the ABU response message will not provide updated account data.

The methods and systems described herein may be implemented using computer programming or engineering techniques including computer software, firmware, hardware or any combination or subset thereof, wherein the technical effect is achieved by performing at least one of: (a) receive, from a merchant, a request for updated account data for a set of account numbers, the request including the set of account numbers and a merchant identifier, the list of account numbers including one or more account numbers, the merchant identifier being a non-enriched merchant identifier; (b) retrieve from a database transaction data associated with one or more merchants, such data including a list of account numbers with which the one or more merchants has transacted; (c) identify a target merchant by determining which merchant from the transaction database has transacted with each account identifier included in the merchant request; (d) associate the target merchant with the non-enriched merchant identifier to generate an enriched merchant identifier.

The systems and methods described herein provide the technical advantages of (a) preventing transaction denial due to stale account data; (b) enabling cardholders to control access to account data; (c) controlling and policing access to ABU systems; and (d) increasing issuer participation in ABU systems.

In one embodiment, a computer program is provided, and the program is embodied on a computer-readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application to providing a data enrichment system for enabling cardholder controlled access to updated account data.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account data, such as mobile phones, personal digital assistants (PCAs), and key fobs.

FIG. 1 is a schematic diagram illustrating a payment platform 100 that includes a regulated automatic billing updater (ABU) computing device 120. Embodiments described herein may relate to a transaction card system, such as a payment card payment system using the Mastercard® interchange network. The Mastercard® interchange network is a set of proprietary communications standards promulgated by Mastercard International Incorporated for the exchange of financial transaction data and the settlement of funds between financial institutions that are associated with Mastercard International Incorporated.

In a typical transaction card system, a financial institution referred to as the "issuer" 104 issues a transaction card, such as a credit card, debit card, and the like, to the consumer or cardholder 102, who uses the transaction card to tender payment for a purchase from merchant 110. To accept payment with the transaction card, merchant 110 normally establishes an account with a financial institution that is part of the financial payment system. This financial institution is referred to as the "merchant bank," the "acquiring bank," or the "acquirer." In one embodiment, cardholder 102 tenders payment for a purchase and merchant 110 then requests authorization from a merchant bank 108, also referred to as a merchant processor, for the amount of the purchase. The request is usually performed through the use of a point-of-sale terminal, which reads account data from a magnetic stripe, a chip, embossed characters, and the like, included on the transaction card of cardholder 102 and communicates electronically with the transaction processing computers of merchant bank 108. In the context of transactions with online merchants, cardholder 102 may provide account data, such as a personal account number (PAN), a card verification number, an expiration date, and the like through a website. Alternatively, merchant bank 108 may authorize a third party to perform transaction processing on its behalf In this case, a point-of-sale terminal may be configured to communicate with the third party. Such a third party may be referred to as a "merchant processor," an "acquiring processor," or a "third party processor."

Using a payment processor 106, computers of merchant bank 108 may communicate with computers of issuer bank 104 to determine whether a cardholder account 112 of cardholder 102 is in good standing and whether the purchase is covered by an available credit line of cardholder account 112. Based on these determinations, the request for authorization may be declined or accepted. If the request is accepted, an authorization code may be issued to merchant 110.

Merchant 110 may store payment card account data corresponding to one or more cardholders in a customer account database 111. In certain embodiments, merchant customer account database 111 may be a local or remote database accessible by merchant 110. During a transaction, merchant 110 may retrieve account data from the merchant customer account database 111 as opposed to acquiring the data from cardholder 102, such as by having cardholder 102 provide his or her payment card account data by swiping a payment card or manually entering payment card data. So called "account-on-file" transactions may include recurring payments such as subscription fees, membership fees, electronic bills, and the like. Account-on-file transactions may also include instances when cardholder 102 is a repeat customer of merchant 110. Accordingly, account-on-file transactions generally require a cardholder to provide his or her payment card account data initially and then to authorize or enroll in an account-on-file service. Once enrolled or authorized, subsequent payments by cardholder 102 may be streamlined by either automatically charging cardholder 102 or by automatically retrieving account data corresponding to cardholder 102 from merchant customer account database 111.

For example, merchant 110 may be an internet service provider (ISP) that provides internet connectivity to cardholder 102 in exchange for a monthly service fee. Cardholder 102 may enroll in an automatic bill pay service with the ISP to pay for the monthly service charge. The ISP may store cardholder's 102 account data in customer account database 111 and submit the monthly service charges to issuer 104. As another example, merchant 110 may correspond with an online merchant from which cardholder 102 makes regular purchases. Cardholder 102 may create a user profile with the online merchant 110 and provide his or her payment card account data, which the online merchant may then store in customer account database 111. When cardholder 102 later logs onto the online merchant's website and selects goods or services for purchase, online merchant 110 may retrieve cardholder's 102 payment card account data from customer account database 111 and facilitate cardholder's 102 purchase by automatically populating purchase forms or performing similar steps with the retrieved account data.

Although account-on-file transactions provide improved efficiency for both merchants and cardholders, payment card account data is subject to change. For example, a payment card's expiration date may lapse or issuer 104 may reissue a payment card with a different primary account number (PAN). If merchant 110 attempts to submit a transaction to issuer 104 for authorization after such a change and uses stale account data, issuer 104 is likely to reject the transaction. Accordingly, regulated ABU computing device 120 may be implemented to ensure that account data maintained by merchant 110 is current. Specifically, regulated ABU computing device 120 may periodically receive payment card account data updates from one or more issuers, such as issuer 104, and store the received current payment card account data in an account database 180. Regulated ABU computing device 120 may then make the stored current payment card account data available to merchant 110 upon request so that merchant 110 may update their respective customer account database 111. In some embodiments, merchant bank 108 may accumulate merchant 110 update requests into a batch that is then submitted to regulated ABU computing device 120 for processing.

Regulated ABU computing device 120 is also in communication with payment processor 106 to collect and aggregate transaction data. The transaction data may include a list of PANs and a list of merchants 110 with which the PANs have transacted. The transaction data is indexed by merchant, and thus each merchant 110 in the database is associated with an individual list of PANs. Transaction data may also include transaction dates and times, the physical addresses associated with transactions, transaction amounts, etc. Transaction data is stored in an ABU transaction database 190, and may be stored together with the data of account database 180 or in a separate database. The transaction data may include transactions completed within a specified window of time (e.g., within the past ninety days). Merchants 110 included with the transaction data may be identified using merchant transaction identifiers. Merchant transaction identifiers may be similar to the identifiers found in cardholder 102 transaction summaries, such as might appear in account statements or bills. Merchant transaction identifiers are meant to be recognizable to cardholders 102.

The regulated. ABU computer device is communicatively coupled to merchant 110, or other requesting party, over a first network connection. The regulated ABU computing device is communicatively coupled to cardholder 102 over a second network connection. The first and/or second network connection may include, for example, a local area network (LAN) or a wide area network (WAN), dial-in-connections, cable modems, special high-speed Integrated Services Digital Network (ISDN) lines, a wireless network adapter or a wireless data transceiver for use with a mobile phone network, Global System for Mobile communications (GSM), 3G, or other mobile data network or Worldwide Interoperability for Microwave Access (WIMAX). In some embodiments, the regulated. ABU computing device may be communicatively coupled to payment processor 106. In one embodiment, the regulated ABU computing device is in communication with or is a part of payment processor 106. Each network interface may be associated with IP address information (e.g., interface IP address and subnet) to enable the exchange of data.

Figure 2:
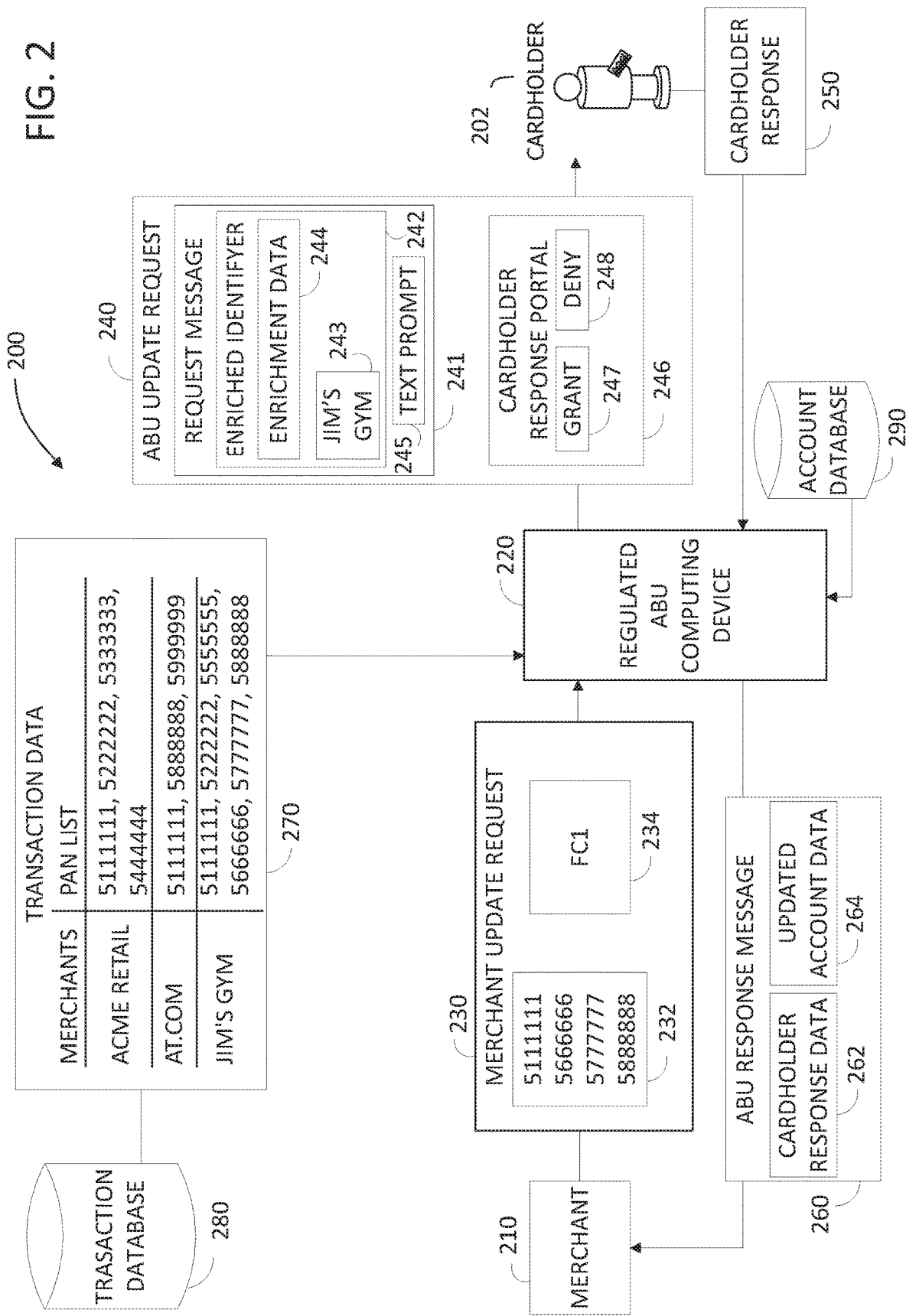

FIG. 2 is a schematic diagram illustrating an exemplary multi-party network system 200 including a regulated ABU computing device 220 for enriching merchant identifiers associated with requests for updated cardholder data. In one embodiment, regulated ABU computing device 220 is similar to or the same as regulated ABU computing device 120 with respect to FIG. 1. If merchant 210, or other requesting party, wishes to verify or update account data for a list of customer personal account numbers (PANs), a merchant update request 230 may be submitted to regulated ABU computing device 220. Merchant update request 230 includes the list of PANs 232 associated with the customer accounts for which merchant 210 wants updated data. Merchant update request 230 may include a non-enriched merchant identifier 234. Non-enriched merchant identifier 234 may include identifying data elements which may not correlate with an easily recognizable merchant name and thus may obfuscate the identity of the merchant to a cardholder.

Upon receiving merchant update request 230, regulated ABU computing device 220 retrieves transaction data 270 from transaction database 280. Transaction data 270 includes lists of PANs, wherein the PAN lists are associated with individual merchants. Merchants in transaction data 270 may be identified by corresponding merchant transaction identifiers. PAN list 232 in merchant update request 230 is compared to each PAN list stored in transaction data 270. If PAN list 232 is found to be a subset of a PAN list in the transaction data 270, the associated merchant transaction identifier is used to identify a target merchant. As used herein, a "subset" may refer to one of a proper and improper subset.

For example, merchant update request 230 might include "FC1" as non-enriched merchant identifier 234, and a PAN list 232 consisting of the following PANs: 5111111, 5666666, 5777777, 5888888. Upon comparing PAN list 232 to the PAN lists in transaction data 270, regulated ABU computing device 220 will identify Jim's Gym as the target merchant.

In some embodiments, after identifying a target merchant regulated ABU computing device 220 may generate one or more ABU update requests 240. An ABU update request 240 may be sent to each cardholder 202 whose PAN is included in PAN list 232. ABU update request 240 may include a request message 241 and a cardholder response portal 246. Request message 241 may include an enriched merchant identifier 242. In some embodiments, the regulated ABU computing device 220 may use the merchant transaction identifier 243 of the target merchant to generate enriched merchant identifier 242. In some embodiments, regulated ABU computing device 220 may use the target merchant's transaction identifier 243 in combination with other transaction data, herein referred to as enrichment data 244, to generate enriched merchant identifier 242. Enrichment data 244 may include the date and/or time of recent transactions with the target merchant, the physical address of the target merchant, transaction amounts of recent transactions with the target merchant, etc. In some embodiments, enrichment data 244 may be retrieved by regulated ABU computing device 220 from transaction database 280. In some embodiments, request message 241 may include a text prompt indicating to the message recipient that the merchant identified by enriched merchant identifier 242 has submitted a request for updated account data. Cardholder response portal 246 is configured to enable cardholder 202 to either grant 247 or deny 248 merchant 210's request for updated account data. In some embodiments, the options to grant or deny the request appear within cardholder response portal 246 as buttons labeled "GRANT" and "DENY" on an interactive touchscreen.

Cardholder 202's decision to either grant 247 or deny 248 merchant 210's data update request generates a cardholder response 250 which is transmitted to regulated ABU computing device 220. In some embodiments, regulated ABU computing device 220 receives cardholder response 250 and generates an ABU response message 260 including cardholder response data 262. Cardholder response data 262 includes but is not limited to data indicating the decision of cardholder 202 to either grant or deny merchant 210 access to updated account data. If the request is granted by cardholder 202, ABU response message 260 may include updated account data 264 in fulfillment of the original request. If merchant 210's request for updated account data is denied by cardholder 202, ABU response message will not provide updated account data 264. ABU response message 260 is transmitted to merchant 210.

Figure 3:
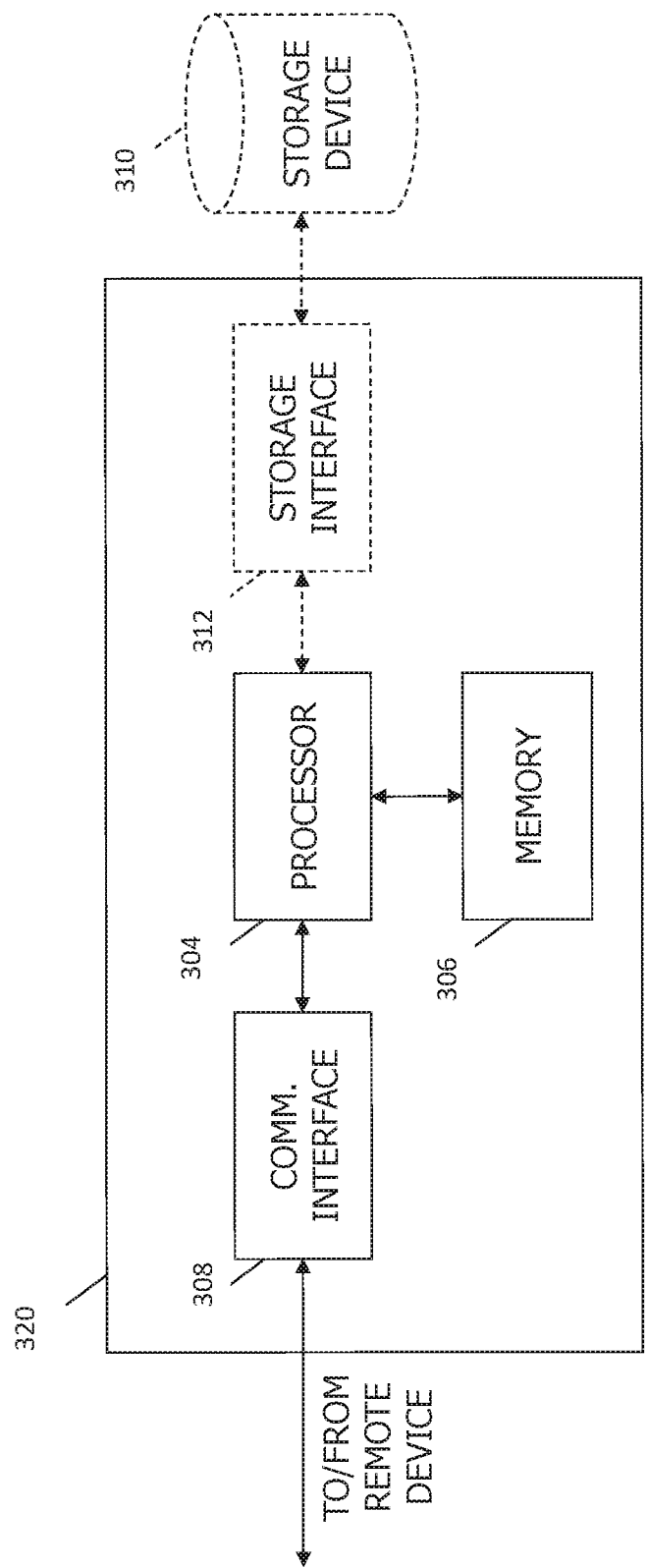

FIG. 3 illustrates an example configuration 300 of a regulated ABU computing device as shown in FIG. 1 and FIG. 2. Regulated ABU computing device 320 includes a processor 304 for executing instructions. Instructions may be stored in a memory area 306, for example. Processor 304 may include one or more processing units (e.g., in a multi-core configuration).

Processor 304 is operatively coupled to a communication interface 308 such that ABU computing device 320 is capable of communicating with a remote device such as a merchant, a cardholder, an issuer, or a payment processor. For example, communication interface 308 may transmit update request messages to cardholders and update response messages to merchants via a network.

Processor 304 may also be operatively coupled to a storage device 310. Storage device 310 is any computer-operated hardware suitable for storing and/or retrieving data. In some embodiments, storage device 310 is integrated in regulated ABU computing device 326. For example, regulated ABU computing device 320 may include one or more hard disk drives as storage device 310. In other embodiments, storage device 310 is external to regulated ABU computing device 320 and may be accessed by a plurality of server computer devices. For example, storage device 310 may include multiple storage units such as hard disks or solid state disks in a redundant array of inexpensive disks (RAID) configuration. Storage device 310 may include a storage area network (SAN) and/or a network attached storage (NAS) system.

In some embodiments, processor 304 is operatively coupled to storage device 310 via a storage interface 312. Storage interface 312 is any component capable of providing processor 304 with access to storage device 310. Storage interface 312 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 304 with access to storage device 310.

Memory area 306 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
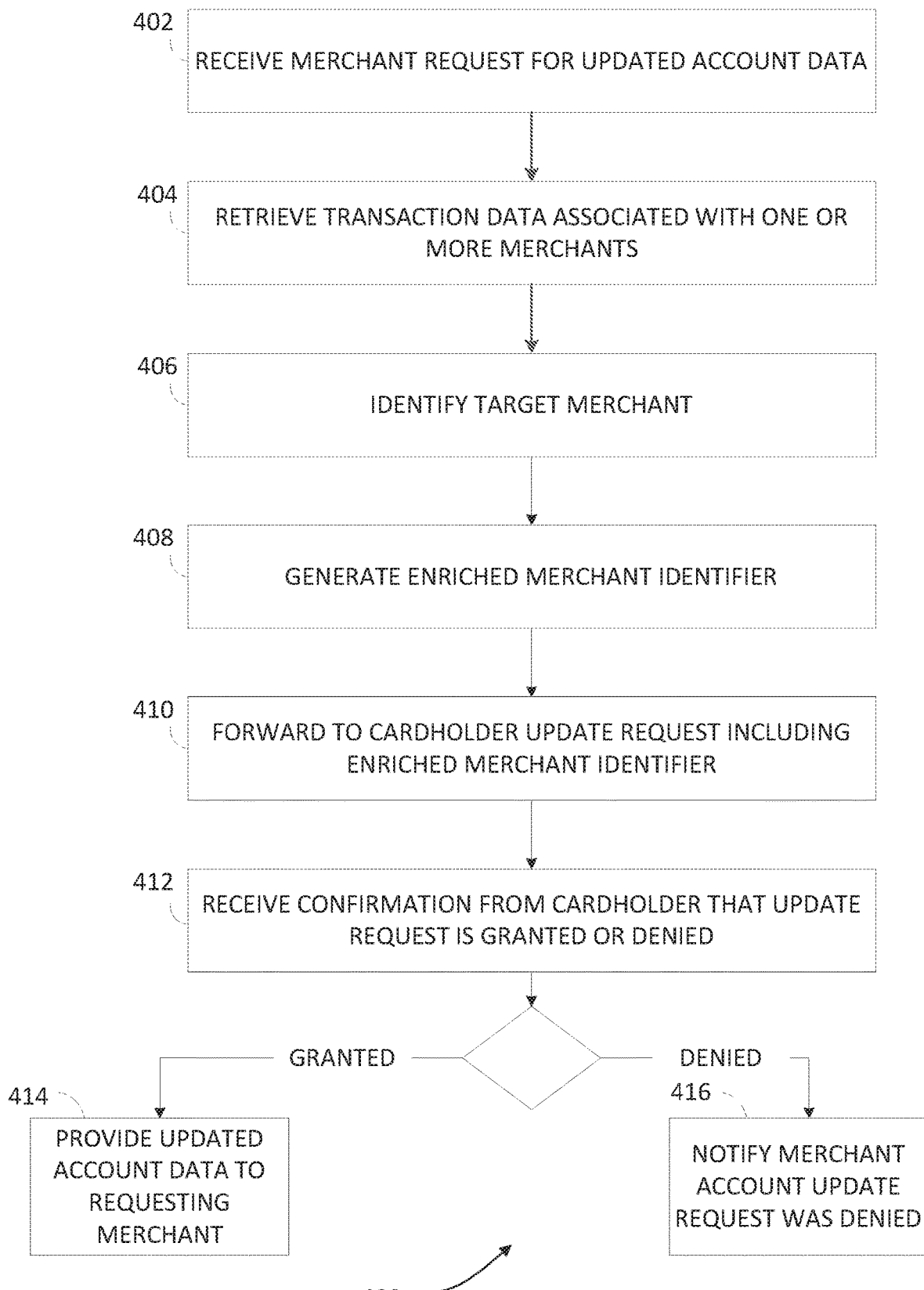

FIG. 4 is a flowchart of a method 400 for enriching merchant identifiers associated with requests for updated cardholder data. In the example embodiment, method 400 is performed by a regulated ABU computing device, such as regulated ABU computing device 220 with respect to FIG. 2. In certain embodiments, method 400 may at least be partially performed by a different computing device. In other embodiments, method 400 may include additional, fewer, or alternative actions, including those described herein.

In 402, the regulated ABU computing device receives a merchant request for updated account data. The request may include, for example, a list of personal account numbers (PANs) and a non-enriched merchant identifier. In one embodiment, the regulated ABU computing device retrieves 404 transaction data associated with one or more merchants. The transaction data may include one or more merchants identified by merchant transaction identifiers. The transaction data my further include a list of PANs with which the merchants have transacted. The regulated ABU computing device compares the PAN list in the merchant request to the PAN lists in the transaction data to identify 406 a target merchant. The regulated ABU computing device may use the merchant transaction identifier of the target merchant in combination with other transaction data to generate 408 an enriched merchant identifier. The regulated ABU computing device forwards 410 the merchant update request to a cardholder and includes the enriched merchant identifier. The regulated ABU computing device receives 412 confirmation from the cardholder that the update request is granted or denied. If the update request is granted, the regulated ABU computing device may provide 414 updated account data to the requesting merchant. If the update request is denies, the regulated ABU computing device may notify 416 the merchant the update request was denied.

As will be appreciated based on the foregoing specification, the above-described examples of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed examples of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

For example, one or more computer-readable storage media may include computer-executable instructions embodied thereon for enriching merchant identifiers included within account update requests. In this example, the computing device may include a memory device and a processor in communication with the memory device, and when executed by said processor the computer-executable instructions may cause the processor to perform a method such as the method described and illustrated in the example of FIG. 2.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

This written description uses examples to describe embodiments of the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A regulated automatic billing updater (ABU) computing device for enriching data included within a data set, the regulated ABU computing device comprising one or more processors in communication with one or more memory devices, said regulated ABU computing device configured to:
   receive, from a merchant, a request for updated account data for a set of account identifiers, the request including the set of account identifiers and a merchant identifier associated with the merchant, the set of account identifiers including one or more account identifiers each associated with a respective cardholder, the merchant identifier being a non-enriched merchant identifier;
   retrieve, from a database, transaction data associated with one or more merchants including the merchant, the transaction data including i) a respective merchant transaction identifier associated with each of the one or more merchants and ii) a respective list of account identifiers having been used to initiate a transaction with each of the one or more merchants;
   match the merchant to a target merchant of the one or more merchants by comparing the respective list of account identifiers associated with the target merchant in the transaction database to the set of account identifiers included in the request;
   generate an enriched merchant identifier associated with the merchant based on the merchant transaction identifier of the target merchant;
   generate, for each respective cardholder associated with the set of account identifiers in the request, a cardholder request message including the enriched merchant identifier and a text prompt indicating that the merchant has requested access to the updated account data of the respective cardholder; and
   submit each cardholder request message to the respective cardholder.

2. A device in accordance with claim 1, wherein the enriched merchant identifier consists of the merchant transaction identifier and enrichment data derived from the transaction data.

3. A device in accordance with claim 1 further configured to receive confirmation from each respective cardholder that the update request is granted or denied.

4. A device in accordance with claim 3 wherein the cardholder request message is submitted, and the confirmation is received, through a cardholder response portal.

5. A device in accordance with claim 1 further configured to fulfill the request for a given account identifier upon receiving confirmation from an associated cardholder that permission to fulfill the request has been granted.

6. A device in accordance with claim 1 further configured to notify a requesting party of denial of the request upon receiving confirmation from an associated cardholder that permission to fulfill the request has been denied.

7. A computer-implemented method for enriching data included within a data set, said method implemented using a regulated automatic billing updater (ABU) computing device, said method comprising:
   receiving, by the regulated automatic billing updater (ABU) computing device from a merchant, a request for updated account data for a set of account identifiers, the request including the set of account identifiers and a merchant identifier associated with the merchant, the set of account identifiers including one or more account identifiers each associated with a respective cardholder, the merchant identifier being a non-enriched merchant identifier;
   retrieving, from a database, transaction data associated with one or more merchants including the merchant, the transaction data including i) a respective merchant transaction identifier associated with each of the one or more merchants and ii) a respective list of account identifiers having been used to initiate a transaction with each of the one or more merchants;
   matching, by the ABU computing device, the merchant to a target merchant of the one or more merchants by comparing the respective list of account identifiers associated with the target merchant in the transaction database to the set of account identifiers included in the request;
   generating, by the ABU computing device, an enriched merchant identifier associated with the merchant based on the merchant transaction identifier of the target merchant
   generating, by the ABU computing device for each respective cardholder associated with the set of account identifiers in the request, a cardholder request message including the enriched merchant identifier and a text prompt indicating that the merchant has requested access to the updated account data of the respective cardholder; and
   submitting, by the ABU computing device, each cardholder request message to the respective cardholder.

8. A method in accordance with claim 7 wherein the enriched merchant identifier consists of the merchant transaction identifier and enrichment data derived from the transaction data.

9. A method in accordance with claim 7 further comprising receiving confirmation from each respective cardholder that the update request is granted or denied.

10. A method in accordance with claim 9, wherein the cardholder request message is submitted, and the confirmation is received, through a cardholder response portal.

11. A method in accordance with claim 7, wherein fulfillment of the request for a given account identifier is granted upon receiving confirmation from an associated cardholder that permission to fulfill the request has been granted.

12. A method in accordance with claim 7, wherein a requesting party is notified denial of the request upon receiving confirmation from the associated cardholder that permission to fulfill the request has been denied.

13. A non-transitory computer readable medium that includes computer-executable instructions for enriching data within a data set, wherein when executed by at least one processor of a regulated automatic billing updater (ABU) computing device, the computer-executable instructions cause the at least one processor to:
   receive, from a merchant, a request for updated account data for a set of account identifiers, the request including the set of account identifier and a merchant identifier associated with the merchant, the set of account identifiers including one or more account identifiers each associated with a respective cardholder, the merchant identifier being a non-enriched merchant identifier;
   retrieve, from a database, transaction data associated with one or more merchants including the merchant, the transaction data including i) a respective merchant transaction identifier associated with each of the one or more merchants and ii) a respective list of account identifiers having been used to initiate a transaction with each of the one or more merchants;
   match the merchant to a target merchant of the one or more merchants by comparing the respective list of account identifiers associated with the target merchant in the transaction database to the set of account identifiers included in the request;
   generate an enriched merchant identifier associated with the merchant based on the merchant transaction identifier of the target merchant;
   generate, for each respective cardholder associated with the set of account identifiers in the request, a cardholder request message including the enriched merchant identifier and a text prompt indicating that the merchant has requested access to the updated account data of the respective cardholder; and
   submit each cardholder request message to the respective cardholder.

14. The non-transitory computer readable medium of claim 13, wherein the computer-executable instructions further cause the at least one processor to receive confirmation from each respective cardholder that the update request is granted or denied.

15. The non-transitory computer readable medium of claim 14, wherein the computer-executable instructions further cause the at least one processor to submit the cardholder request message, and receive the confirmation, through a cardholder response portal.

16. The non-transitory computer readable medium of claim 13, wherein the computer-executable instructions further cause the at least one processor to fulfill the request for a given account identifier upon receiving confirmation from an associated cardholder that permission to fulfill the request has been granted.

17. The non-transitory computer readable medium of claim 13, wherein the computer-executable instructions further cause the at least one processor to notify a requesting party of denial of the request upon receiving confirmation from an associated cardholder that permission to fulfill the request has been denied.

* * * * *